United States Patent
Sawada et al.

(10) Patent No.: US 7,142,238 B1
(45) Date of Patent: Nov. 28, 2006

(54) IMAGE PICK-UP DEVICE

(75) Inventors: Kenichi Sawada, Toyohashi (JP);
Atsushi Ishikawa, Okazaki (JP);
Hiroyuki Suzuki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/427,078

(22) Filed: Oct. 26, 1999

(30) Foreign Application Priority Data

Oct. 26, 1998 (JP) ............................. 10-303750

(51) Int. Cl.
*H04N 5/208* (2006.01)
*H04N 1/46* (2006.01)
*H04N 5/247* (2006.01)

(52) U.S. Cl. ................. 348/252; 348/335; 348/264; 358/504

(58) Field of Classification Search ......... 348/252, 348/241, 335, 272, 273, 95, 283, 263; 382/151, 382/163; 399/301; 358/518, 527; 346/252, 346/241, 335, 272, 273
See application file for complete search history.

(56) References Cited

U.S. PATENT DOCUMENTS

| | | | | |
|---|---|---|---|---|
| 5,257,132 A * | 10/1993 | Ceglio et al. | ............... | 359/565 |
| 5,369,450 A * | 11/1994 | Haseltine et al. | ........... | 348/745 |
| 5,414,536 A * | 5/1995 | Kobayashi | ................ | 358/504 |
| 5,751,863 A * | 5/1998 | Farr | ........................ | 382/275 |
| 5,784,158 A * | 7/1998 | Stanco et al. | ............... | 356/326 |
| 5,867,285 A | 2/1999 | Hirota et al. | | |
| 5,905,699 A * | 5/1999 | Ishibashi | ................ | 369/44.26 |
| 6,023,321 A * | 2/2000 | Shiraishi | ...................... | 355/53 |
| 6,088,059 A * | 7/2000 | Mihara et al. | ............. | 348/335 |
| 6,097,430 A * | 8/2000 | Komiya et al. | .......... | 348/218.1 |
| 6,205,244 B1 * | 3/2001 | Bawolek et al. | ........... | 382/162 |
| 6,211,911 B1 * | 4/2001 | Komiya et al. | .......... | 348/218.1 |
| 6,219,463 B1 * | 4/2001 | Hyodo | ....................... | 382/298 |
| 6,320,668 B1 * | 11/2001 | Kim | ............................ | 358/1.1 |
| 6,366,360 B1 * | 4/2002 | Ejiri et al. | ................... | 358/1.9 |
| 6,587,224 B1 * | 7/2003 | Nabeshima et al. | ........ | 358/1.9 |
| 2001/0030697 A1 * | 10/2001 | Dischert et al. | ............ | 348/263 |

FOREIGN PATENT DOCUMENTS

| | | | |
|---|---|---|---|
| JP | 5-110880 | | 4/1993 |
| JP | 06046260 A | * | 2/1994 |
| JP | 06-350904 | | 12/1994 |
| JP | 8-32826 | | 2/1996 |
| JP | 08205181 A | * | 8/1996 |
| JP | 9-261491 | | 10/1997 |

OTHER PUBLICATIONS

Japanese Office Action dated Dec. 8, 2005 with English-language Translation.
Japanese Office Action dated Jun. 6, 2006 with English-language translation.

* cited by examiner

*Primary Examiner*—Lin Ye
(74) *Attorney, Agent, or Firm*—Buchanan Ingersoll & Rooney PC

(57) ABSTRACT

An image pick up device includes a pick-up unit for picking up an image condensed on a line sensor through a lens; a chromatic aberration correction board with a predetermined pattern in accordance with a pick-up resolution; an interpolation factor calculation unit for calculating chromatic aberration interpolation factors to be used for a chromatic aberration correction by using digital image data on the chromatic aberration correction board picked up by the pick-up unit; a line memory for storing the chromatic aberration interpolation factors calculated by the interpolation factor calculation unit; and a chromatic aberration unit for correcting the image data picked up from an original image by using the chromatic aberration interpolation factors outputted from the line memory.

14 Claims, 9 Drawing Sheets

IMAGE PICK-UP DEVICE

BACKGROUND OF THE INVENTION

1. Field of the Invention

The present invention relates to an image pick-up device for picking up a manuscript image.

2. Description of Related Art

When an image of a color manuscript is picked up, the light reflected from the manuscript is focused on a CCD sensor through a lens, and the light is then converted into an electric signal. This electric signal is further converted into digital image data to be outputted from a printer or the like. As shown in FIG. 1, when a white light goes through a lens, depending on the difference of the wave length of the light components, the longer the wave length of the light is, the more inside it condenses, while the shorter the wave length of the light is, the more outside it condenses, which is more so at the edge of the lens compared to at the central part of it. Therefore, when an image like a vertical line is condensed on the CCD sensor, the phases of R(red), G(green) and B(blue) may be shifted from each other. In this manner, the light is influenced by the chromatic aberration of the lens to cause a color shift at the edge of the CCD sensor in the main scanning direction.

Chromatic aberration is not a problem with an image of a comparatively smooth density profile such as that of color patches. It causes, however, a color shift at the edge of a letter or the like. Especially, at the edge of a black letter, a mistaken determination causes a color bleeding or a separation of the letter around the periphery of the letter. Therefore, high quality lenses are required for a copier using a color CCD sensor. However, even if the lens function was improved, the lens system would be larger, which ends up with a larger image pick-up device including the optical system. And the lack of uniformity among the lens part products cannot also be ignored. Therefore, it is necessary to correct this chromatic aberration in the image processing system.

In picking up an image, the main method for chromatic aberration correction is to mix adjoining image data by using chromatic aberration interpolation factors. As the chromatic aberration correction circuit shows in FIG. 2, for example, with respect to R and B data picked up through each scanning of a manuscript, a plurality of phase correction circuits perform a chromatic aberration operation for adjoining three pixels by using plural combinations of phase interpolation factors calculated when the lens(es) are(is) designed, and calculate color saturation data (the maximum value-the minimum value of R, G, and B) for each combination of respective colors to select R, G and B data that minimize this value of color saturation. In this way, chromatic aberration is corrected through calculation. Accordingly, whatever the image data are, the ones with the minimum color saturation are selected. The effect of a chromatic aberration stands out at the edge of black letters but not in other places, therefore, this correction was believed to be enough in practical use.

This color correction operation, however, doesn't have a good correction precision because the interpolation factors are fixed. The interpolation factors can only be selected within limits and moreover, for some image data, different data from the actual chromatic aberration could possibly be selected. And, because the interpolation factors depend on the pick-up resolution or the lens system, in case the pick-up resolution or the lens system is changed, it would be necessary to change the whole design accordingly, which means it lacks the flexibility for general purposes. For general purposes, the interpolation factors should be variable depending on the resolution or the like.

OBJECTS AND SUMMARY

A purpose of the present invention is to provide an image pick-up device which can output color image information signals that are so stable as not to be influenced by a chromatic aberration.

According to one aspect of the present invention, an image pick up device includes a pick-up unit for picking up an image condensed on a line sensor through a lens; a chromatic aberration correction board with a predetermined pattern in accordance with a pick-up resolution; an interpolation factor calculation unit for calculating chromatic aberration interpolation factors to be used for a chromatic aberration correction by using digital image data on the chromatic aberration correction board picked up by the pick-up unit; a line memory for storing the chromatic aberration interpolation factors calculated by the interpolation factor calculation unit; and a chromatic aberration unit for correcting the image data picked up from an original image by using the chromatic aberration interpolation factors outputted from the line memory.

DETAILED DESCRIPTION OF THE PREFERRED EMBODIMENTS

The attached drawings are referred to in describing the preferred embodiments of the invention below. In those drawings, the same reference marks indicate identical or equivalent parts.

A chromatic aberration is corrected by mixing R, G, and B data of adjoining three pixels using chromatic aberration interpolation factors $a_1(n)$, $a_2(n)$ and $a_3(n)$ as follows:

$R(n)=a_1(n)*R(n-1)+a_2(n)*R(n)+a_3(n)*R(n+1)$ $G(n)=G(n)$ $B(n)=a_3(n)*B(n-1)+a_2(n)*B(n)+a_1(n)*B(n+1)$ wherein, n denotes the position of R, G or B pixels from the main scanning standard position.

In case predetermined values for chromatic aberration interpolation factors are used, they could be different from the actual chromatic aberration conditions due to the lack of uniformity of the lens products. Therefore, it is necessary to determine the interpolation factors $a_1(n)$, $a_2(n)$ and $a_3(n)$ by finding the chromatic aberration conditions for respective devices. In the present invention, therefore, multiplier factors of the phase correction circuits which correct the chromatic aberration conditions (i.e. the chromatic aberration interpolation factors) are set independently in real time so that the performance of the device is not influenced by the resolution or the lens system.

Figure 3:
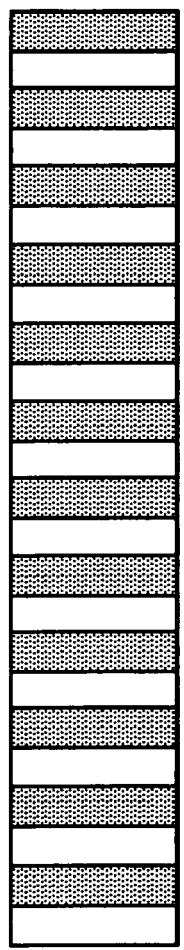
FIG. 3 is a view of a chromatic aberration correction board with a ladder pattern.

FIG. 3 illustrates an example of a chromatic aberration correction board used for finding chromatic aberration interpolation factors. The chromatic aberration correction board is provided with a ladder pattern of vertical lines, the number of which corresponds to a ratio of one for every n pixels in accordance with the pick-up resolution, and it has a width of a plurality of pixels in the auxiliary scanning direction and a length of the entire scanning span in the main scanning direction. The chromatic aberration correction board may be permanently fixed in an area near the document platen, or it may be on a card that is used by a service man.

Figure 4:
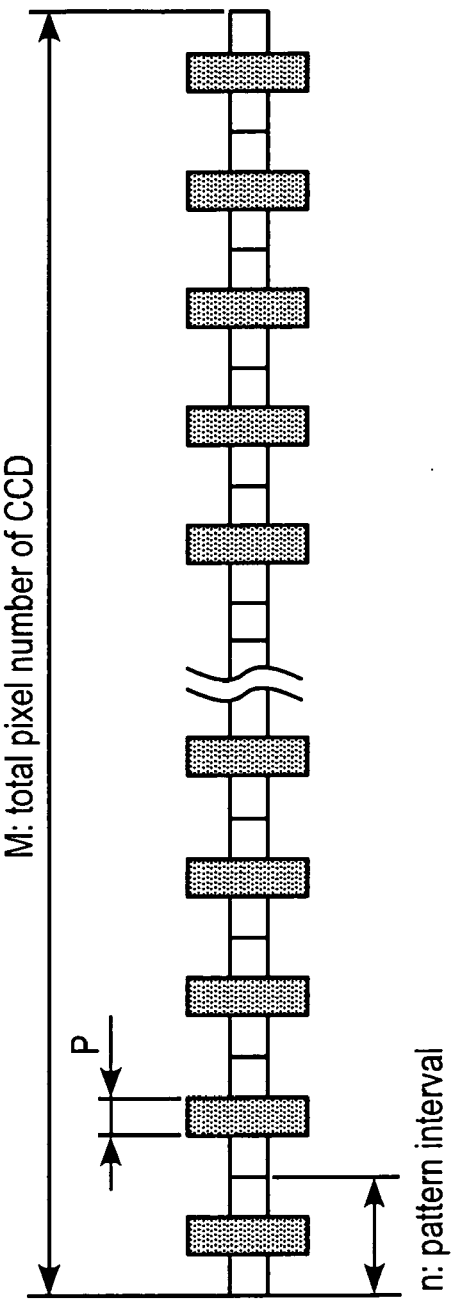
FIG. 4 is a view showing the relationships between a pattern of a color aberration correction board and a pixel pitch of a CCD sensor.

FIG. 4 illustrates the relationships between the pattern of the chromatic aberration correction board and the pixel pitch P of the CCD sensor. In the CCD sensor, the vertical line segments have a width of the pixel pitch P, and each one of them is present for every n pixels. Note that, when M is the total pixel number of the CCD sensor, $1 \leq n \leq M/2$ should be satisfied for n. The chromatic aberration correction board is installed on the lower surface of the manuscript glass or the like in a similar way to a shading correction board.

Figure 5A:
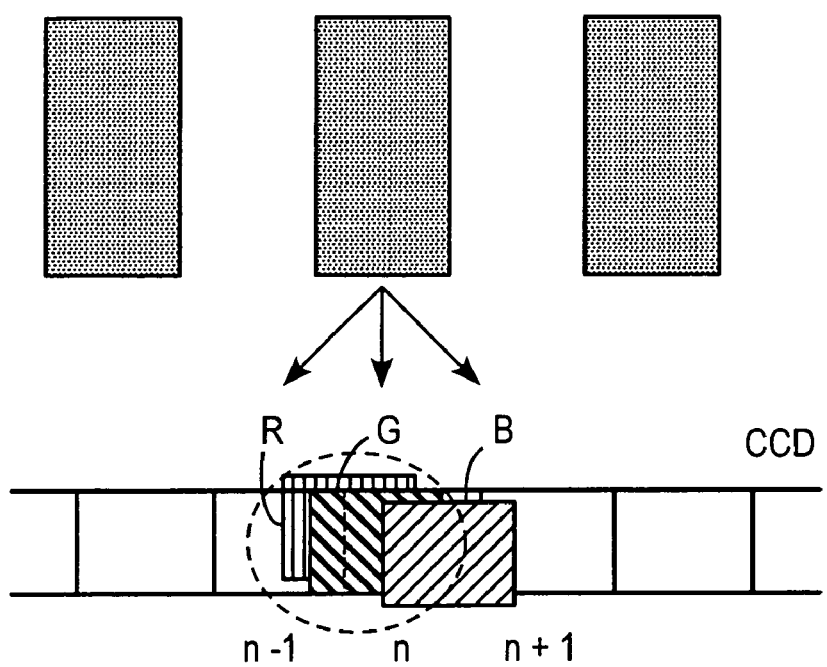
FIGS. 5(a), 5(b), and 5(c) are diagrams illustrating examples of an operation for chromatic aberration interpolation factors.
Figure 5B:
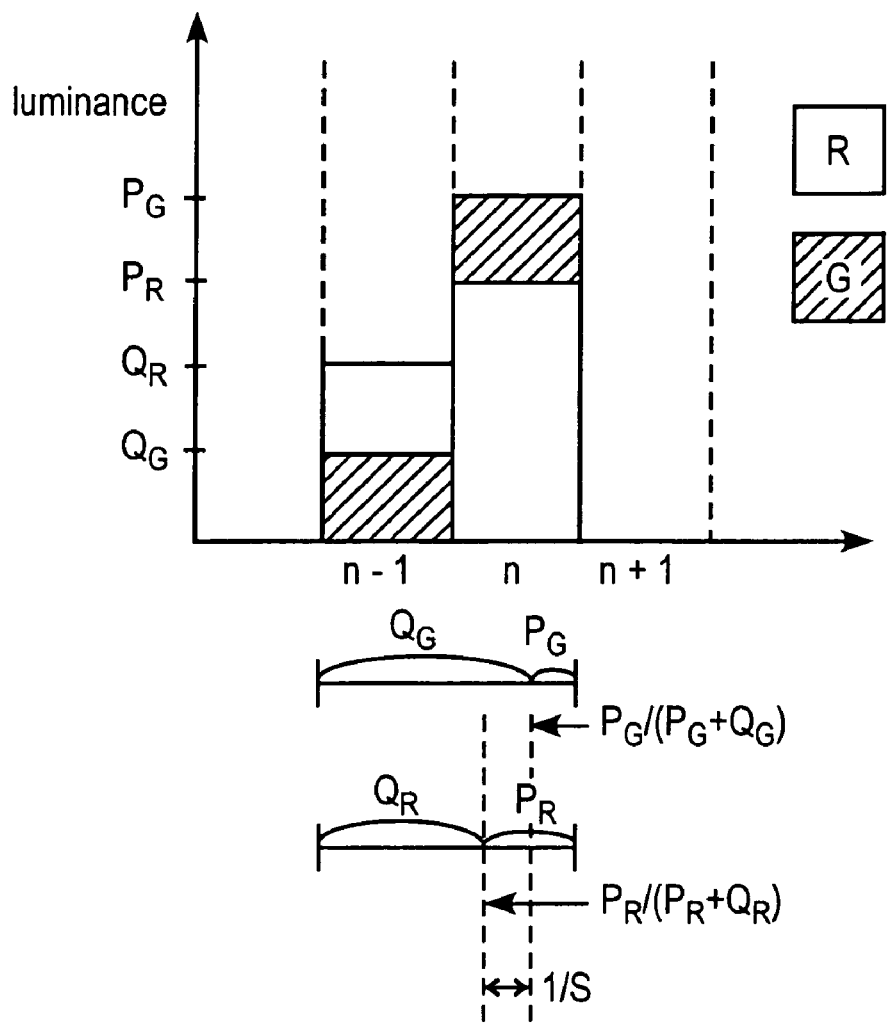
Figure 5C:
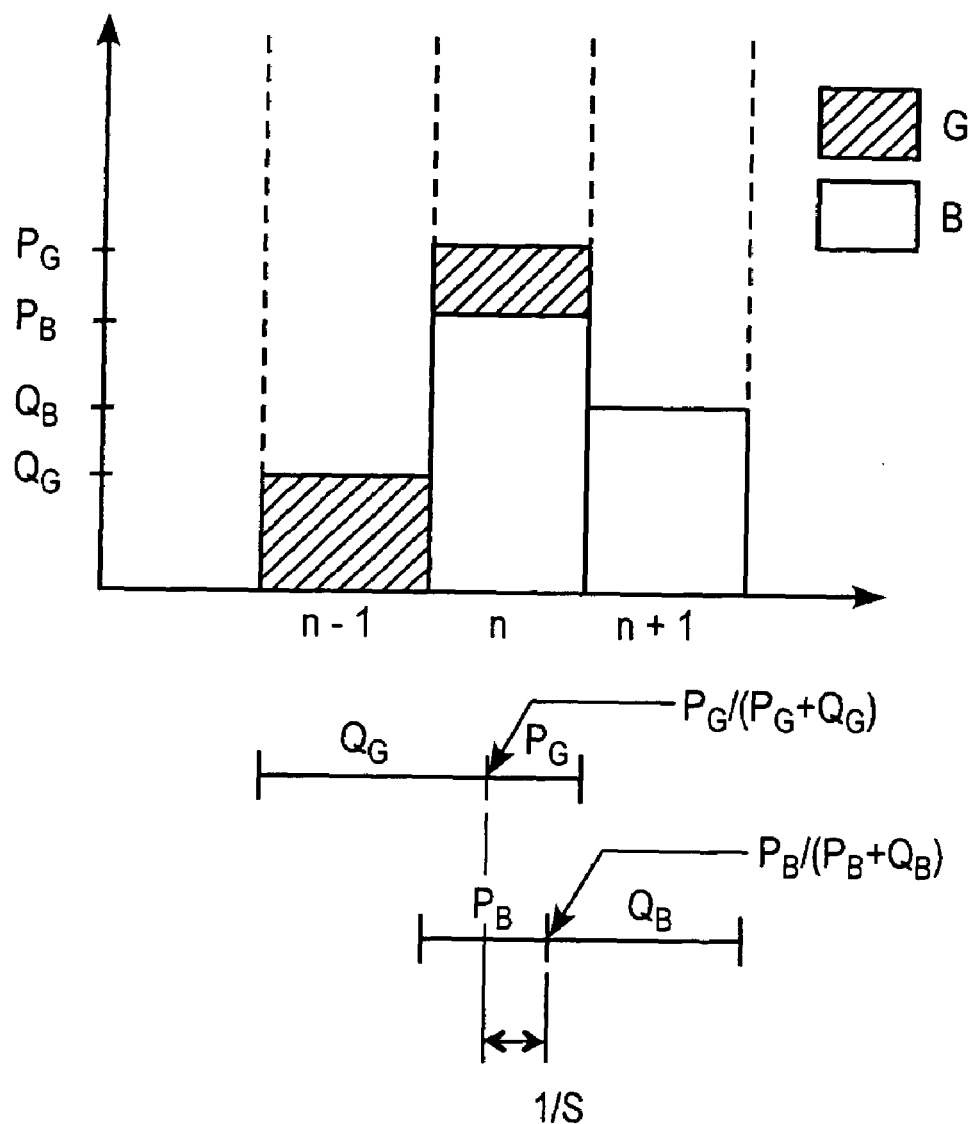

The chromatic aberration interpolation factors are calculated as shown in FIGS. 5(a)–(c). Within the image data of the chromatic aberration correction board picked up while pre-scanning or the like, phase shifts of R or B against G (standard) for every n pixels (shift amounts of the center positions of balance) are detected. And from the shift amounts, the chromatic aberration interpolation factors $a_1(n)$, $a_2(n)$ and $a_3(n)$ are calculated and are stored.

The shifts of the centers of balance are calculated as follows: First of all, the address of G indicating the maximum luminance value in the main scanning direction is found and put as n. Then, the central values of balance are found respectively depending on the luminance values of R, G and B. As the line segments have the width of the pixel pitch, R, G and B signals are gained for adjoining two pixels.

FIG. 5(a) illustrates the aberration of colors R, G, and B on the chromatic aberration correction board as read by the CCD for pixels n−1, n, and n+1. FIG. 5(b) shows the respective luminance values of G and R for pixels n−1, n, and n+1, and FIG. 5(c) shows the respective luminance values of G and R for pixels n−1, n, and n+1.

The variables assigned for each of these values is set forth in table I.

TABLE I

|   | R | G | B |
|---|---|---|---|
| n − 1 | $Q_R$ | $Q_G$ | 0 |
| n | $P_R$ | $P_G$ | $P_B$ |
| n + 1 | 0 | 0 | $Q_B$ |

The center of balance of G is $P_G/(P_G+Q_G)$, the center of balance of R is $P_R/(P_R+Q_R)$, and the center of balance of B is $P_B/(P_B+Q_B)$. The shift amount for R of the center of balance against G (standard), $1/S$, is calculated as follows: $1/S=|P_G/(P_G+Q_G)-P_R/(P_R+Q_R)|$. And, the shift amount for B of the center of balance against G is: $1/S=|P_G/(P_G+Q_G)-P_B/P_B+Q_B|$.

Then the interpolation factors $a_1(n)$, $a_2(n)$ and $a_3(n)$ will be found as follows:

$a_1(n)=1/S$ $a_2(n)=(S-1)/S$ $a_3(n)=0$

As an example, in case the ratios of the luminance values at the positions of addresses n−1, n and n+1 are 1:4:0 for G and 2:3:0 for R, the center of balance of G is 1/5, the center of balance of R is 2/5 and the shift amount for red of the center of balance (1/S) is 1/5. Accordingly, $a_1(n)=1/5$, $a_2(n)=4/5$ and $a_3(n)=0$.

Figure 6:
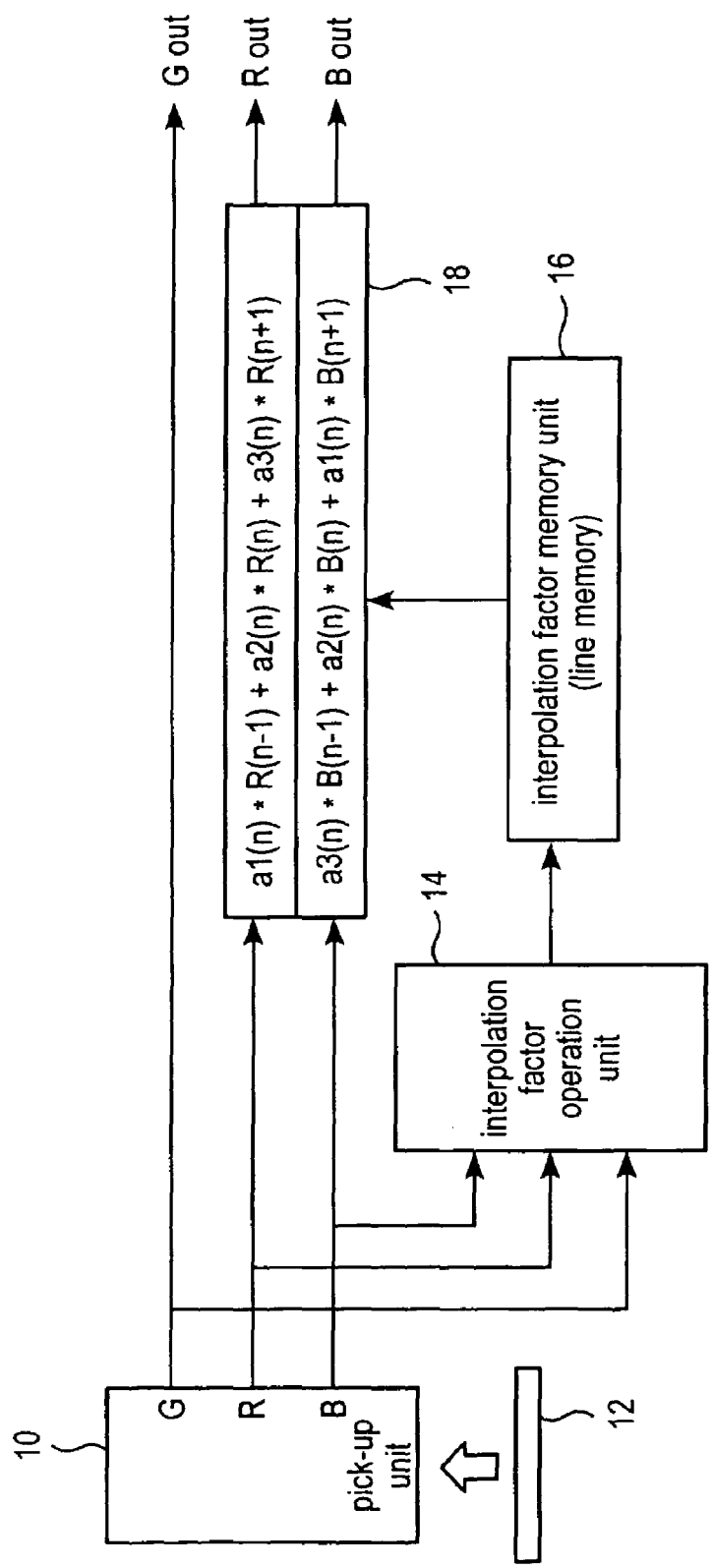
FIG. 6 is a block diagram of an image processing system according to one embodiment of the present invention.

FIG. 6 is referred to in describing a chromatic aberration correction. The chromatic aberration conditions are detected by picking up a specific pattern (a chromatic aberration correction board) 12 through a lens (not shown) at a pick-up unit 10 during the pre-scanning or the like. An interpolation factor operation unit 14 stores the gained image data R, G, and B of the chromatic aberration correction board in a line memory (not shown), and finds, according to the above mentioned equations, the shift amounts of center positions of balance of R (red) or B (blue) against the standard, G (green), for every n pixels from the data picked up from the chromatic aberration correction board, and then calculates the interpolation factors $a_1(n)$, $a_2(n)$ and $a_3(n)$ from the shift amounts. It is preferable to determine the chromatic aberration interpolation factors before scanning either by calculating during the pre-scanning or by calculating only at the time of shipment from the plant. The gained interpolation factors are stored in an interpolation factor memory unit (a line memory) 16.

While scanning, the pick-up unit 10 picks up the image of a color manuscript. At that time, interpolation factors corresponding to the image data are read out as required from the interpolation factor memory unit 16, and a chromatic aberration correction operation is performed for R and B data based on the above mentioned chromatic aberration correction operational expressions in a phase correction circuit 18, which results in the outputs as $R_{out}$ and $B_{out}$. The G data are outputted as $G_{out}$ data as they are. As the phase correction circuit 18 sets the color interpolation factors (the multiplier factors) $a_1(n)$, $a_2(n)$ and $a_3(n)$ which correct the chromatic aberration conditions in this way, it is possible to perform an independent and precise chromatic aberration correction.

The interpolation factors for a chromatic aberration correction, for example, are set in the interpolation factor memory unit 16 by scanning the chromatic aberration correction board when the machine is energized, i.e., when the machine is shipped from the plant or at a similar time. This enables the setting to have a high degree of freedom with only one time of factor calculation when the machine is switched on.

Figure 7:
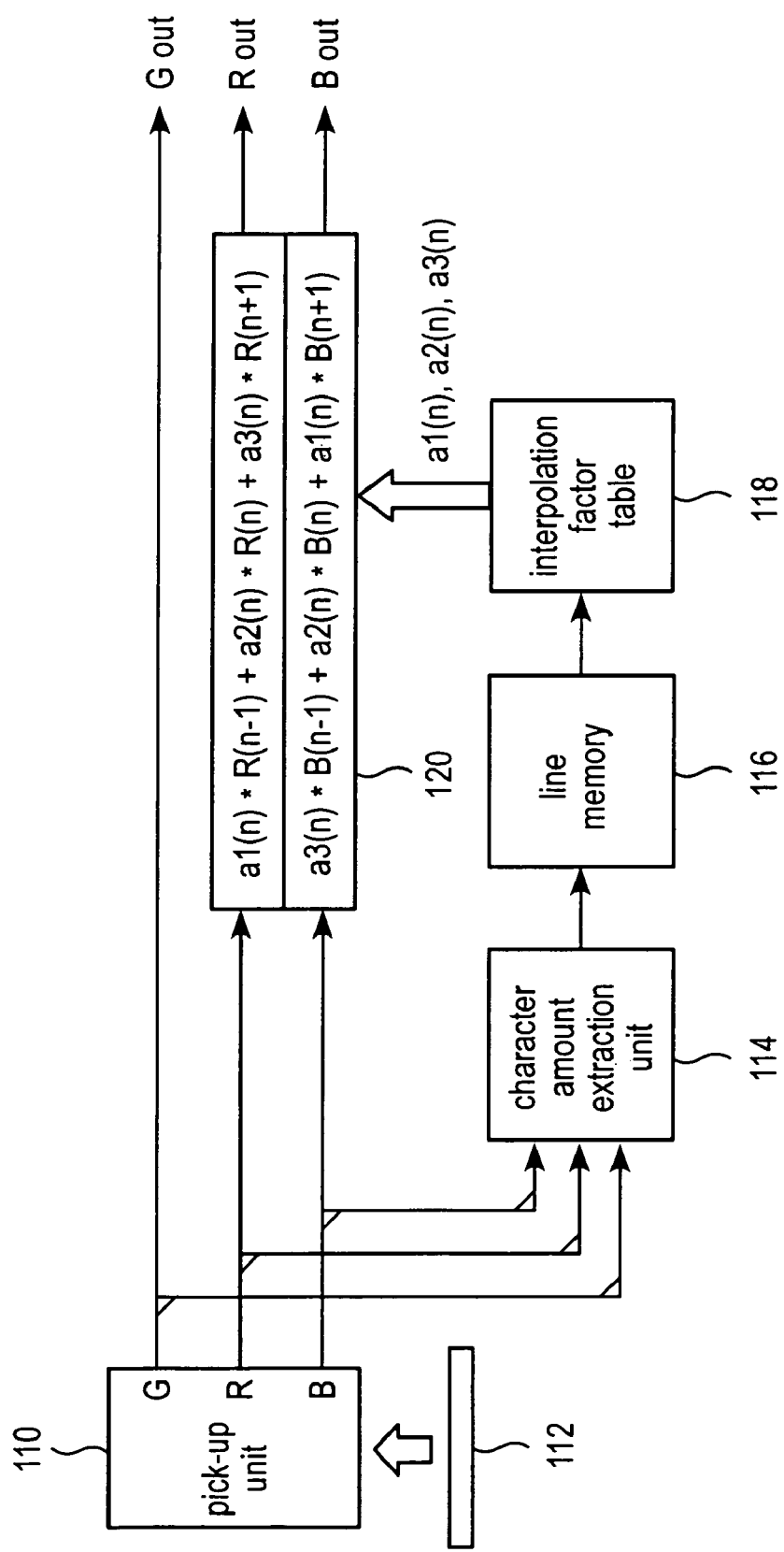
FIG. 7 is a block diagram of an image processing system according to another embodiment of the present invention.

FIG. 7 shows another embodiment of the invention using an interpolation factor table. In case, for example, interpolation factors themselves were stored in the line memory, it would be necessary to store a plurality of combinations of the factors $a_1(n)$, $a_2(n)$ and $a_3(n)$. Accordingly, the memory capacity of the line memory would become larger. In the present embodiment, by storing a character amount (for example, color saturation) and by using an interpolation factor table corresponding to the character amount for the chromatic aberration correction, the line memory capacity is eliminated.

Figure 1:
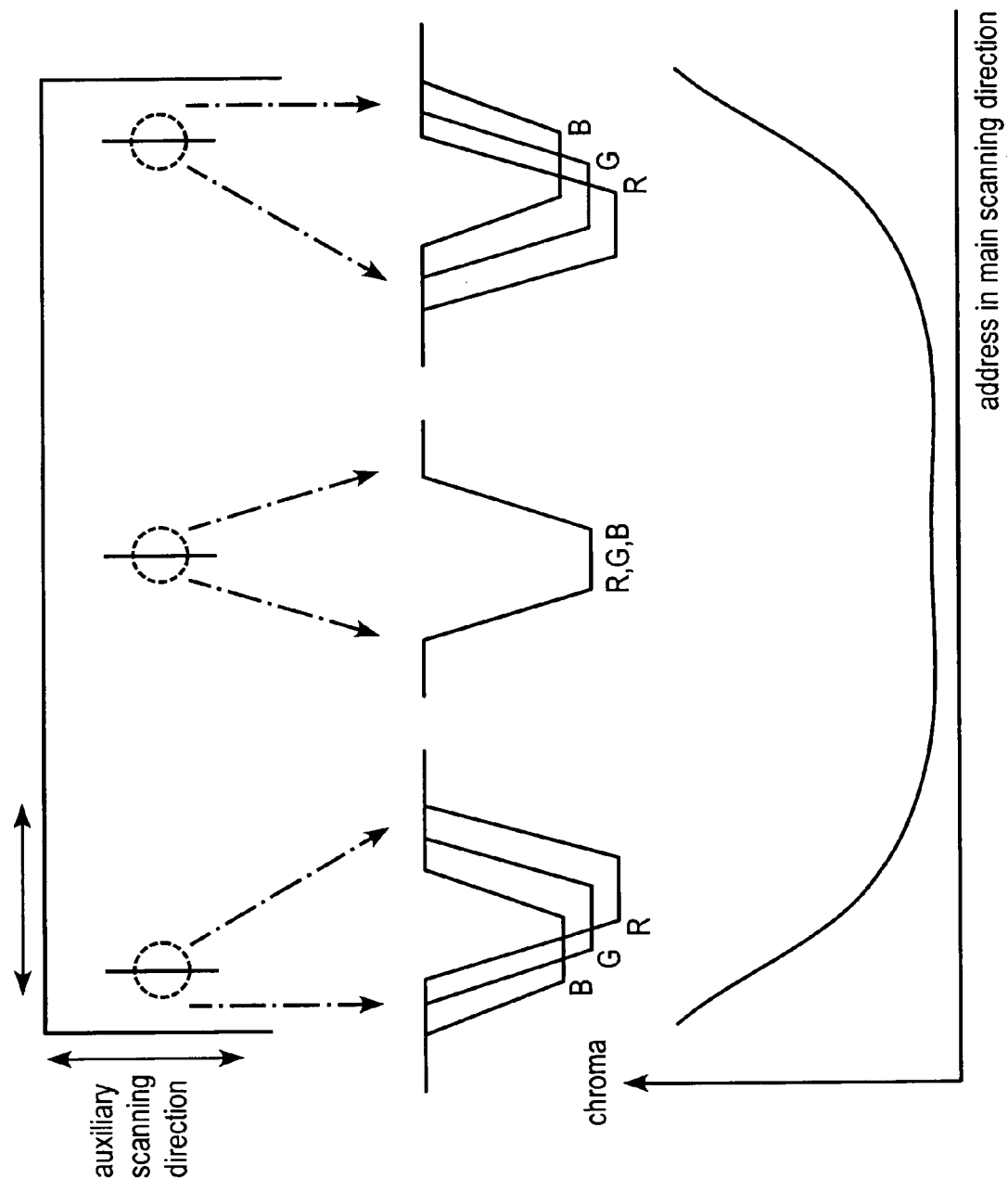
FIG. 1 is a diagram showing the principle of chromatic aberration of a lens.
Figure 2:
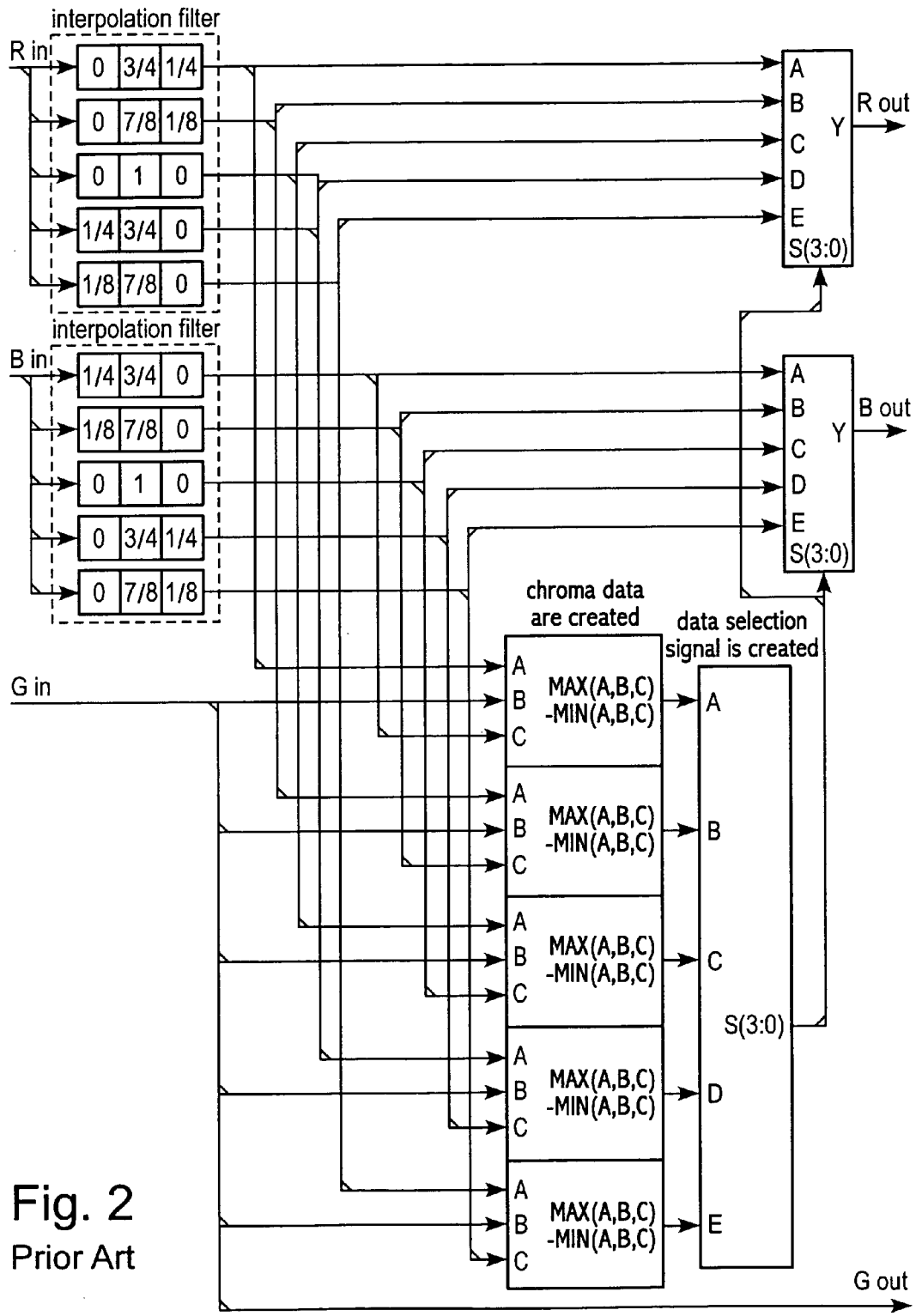
FIG. 2 is a diagram of a chromatic aberration correction circuit according to the prior art.

FIG. 7 illustrates that a pick-up unit 110 picks up a specific pattern (such as on a chromatic aberration correction board) 112 during pre-scanning, or the like, to detect the chromatic aberration conditions. A character amount extraction unit 114 extracts a character amount (for example, color saturation) from the gained image data R, G and B of the chromatic aberration correction board, which is then stored in a line memory 116. (An example of a color saturation extraction is shown in FIG. 1.) An interpolation factor table 118 stores the chromatic aberration interpolation factors corresponding to the character amount inputted from the line memory 116.

When the pick-up unit 110 picks up an image of a color manuscript during the scanning, the line memory 116 outputs data of a character amount into the interpolation factor table 118, and the table 118 outputs the interpolation factors $a_1(n)$, $a_2(n)$ and $a_3(n)$ into a phase correction circuit 120. The phase correction circuit 120 performs the above mentioned chromatic aberration correction operation for R and B data using the interpolation factors $a_1(n)$, $a_2(n)$ and $a_3(n)$, and outputs the results as Rout and Bout. The G data are outputted as Gout data as they are.

Figure 8:
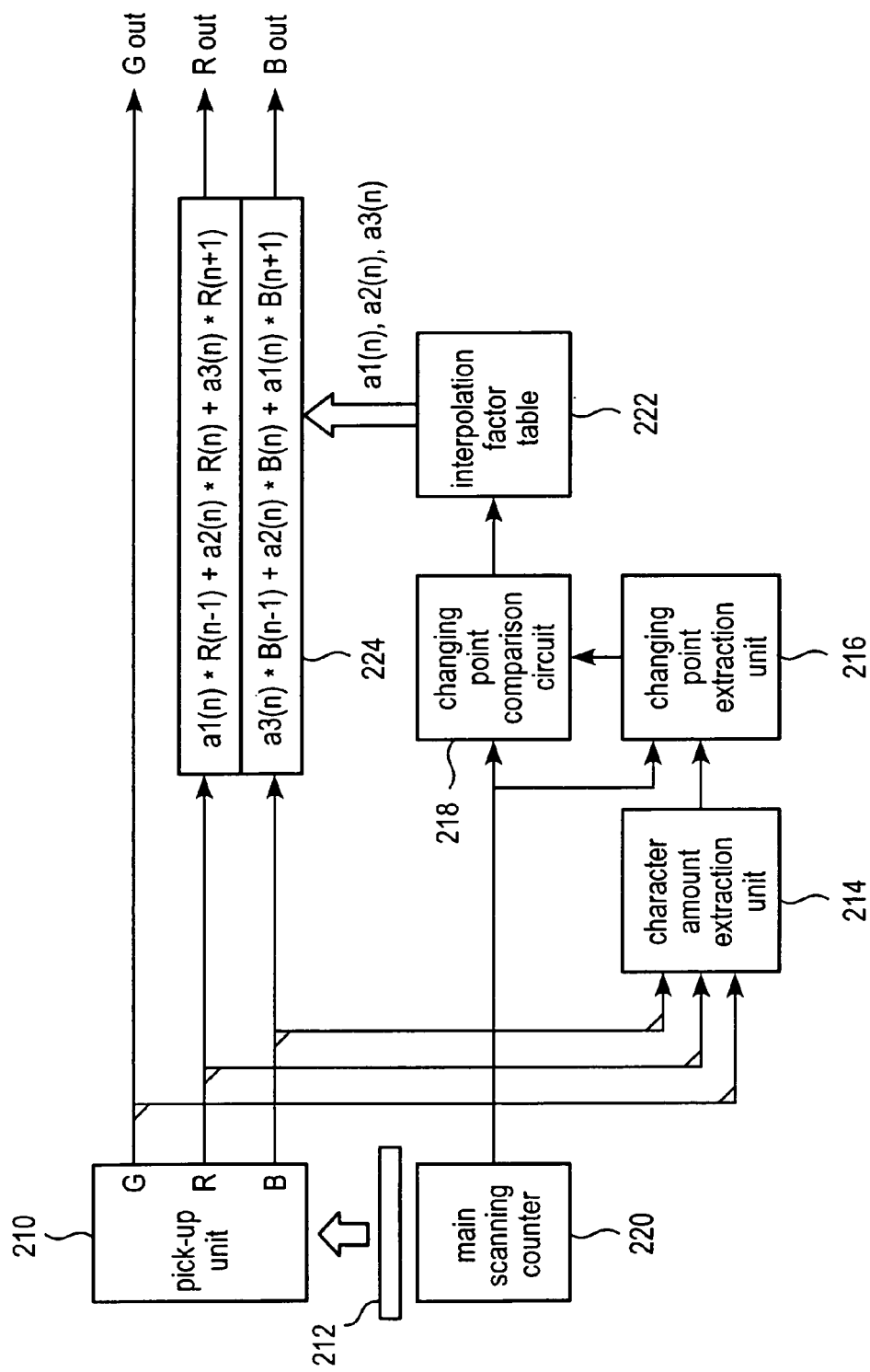
FIG. 8 is a block diagram of an image processing system according to yet another embodiment of the present invention.

FIG. 8 shows another embodiment of the invention using a changing point detection, and which does not use the line memory capacity. In this embodiment, like the previous one, color interpolation factors are set based on a character amount gained when a specific pattern (a chromatic aberration correction board) picked up when pre-scanning, but the specific way of setting is different. Considering the fact that forms of chromatic aberration interpolation factors can be expected to a certain degree, memorizing the changing point of the chromatic operation interpolation factors would make it possible to calculate the factors with a smaller memory capacity. When scanning, therefore, a changing point is found in a changing point comparison circuit based on the changing point of a character amount to set chromatic aberration interpolation factors in the interpolation factor table based on the changing point comparison data.

FIG. 8 is referred to in describing that, while pre-scanning or at some other time, the pick-up unit 210 picks up a specific pattern (a color aberration correction board) 212 to detect the chromatic aberration conditions. A character amount extraction unit 214 extracts a character amount (for example, color saturation) from the gained image data R, G and B of the chromatic aberration correction board 212, and a changing point extraction unit 216 extracts the changing point of the character amount to be stored. An interpolation factor table 222 memorizes chromatic aberration interpolation factors corresponding to the changing point.

While scanning, the pick-up unit 210 picks up an image of a color manuscript. At that time, a changing point comparison circuit 218 compares the changing point stored in the changing point extraction unit 216 with the pixel address from the main scanning counter 220, and based on the result, finds the interpolation factors $a_1(n)$, $a_2(n)$ and $a_3(n)$ in the interpolation factor table 222 to be outputted to a phase correction circuit 224. In the phase correction circuit 224, the above mentioned chromatic aberration correction operation is performed for R and B data to output the results as Rout and Bout. The G data are outputted as Gout data as they are.

As the interpolation factors to correct a chromatic aberration is set independently in real time, the correction precision is high. And the chromatic aberration correction can be performed without being influenced by the lens resolution or the lens systems.

The correction of the chromatic aberration factors can be performed with a high correction precision when pre-scanning.

As the correction of the chromatic aberration factors can be performed when the power is turned on or at the time of shipment from the plant or at a similar time to these, the degree of freedom for the setting is high with only one time of calculation for the factors.

The memory capacity for interpolation factors can be eliminated.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed:

1. An image pick-up device comprising:
   a sensor which picks up an image through a lens;
   a pattern image with a predetermined pattern, wherein said predetermined pattern is a ladder pattern of vertical lines, each one of which is present for every n pixels of said sensor, wherein $1 \leq n \leq M/2$ is satisfied for n when M is the total pixel number of said sensor;
   a calculation unit which detects shift amounts of center positions of colors against a center position of a standard color for every n pixels by using image data picked up from the pattern image and calculates chromatic aberration factors based on the detected shift amounts;
   a memory which stores the calculated chromatic aberration factors; and
   a correction unit which corrects image data picked up from an original image based on the stored chromatic aberration factors.

2. An image pick-up device as claimed in claim 1, wherein the pattern image is formed on a chromatic aberration board.

3. An image pick-up device as claimed in claim 2, wherein the chromatic aberration board is fixed in an area near a document platen.

4. An image pick-up device as claimed in claim 1, wherein the memory is a line memory.

5. An image pick-up device as claimed in claim 1, wherein the chromatic aberration factors are stored in the memory for each color component.

6. An image pick-up device as claimed in claim 1, wherein a width of the ladder pattern is equal to a width of a plurality of pixels in an auxiliary scanning direction and a length of the ladder pattern is equal to a length of an entire scanning span in a main scanning direction.

7. An image pick-up device comprising:
   a sensor which picks up an image through a lens;
   a pattern image with a predetermined pattern, wherein said predetermined pattern is a ladder pattern of vertical lines, each one of which is present for every n pixels of a sensor, wherein $1 \leq n \leq M/2$ is satisfied for n when M is the total pixel number of said sensor;
   a determining unit which determines a character amount of the image data picked up from the pattern image;
   a setting unit which sets chromatic aberration factors based on the character amount; and
   a correction unit which corrects image data picked up from an original image by using the chromatic aberration factors set by the setting unit.

8. An image pick-up device claimed in claim 7, wherein the device further comprises a memory which stores the determined character amount and outputs the character amount to the setting unit, and the setting unit includes a table which stores the relationship between the chromatic aberration factors and the character amount.

9. An image pick-up device claimed in claim 7, wherein the device further comprises an extraction unit which extracts a changing point of the character amount, and a memory which stores the changing point and outputs the changing point to the setting unit, and the setting unit includes a table which stores the relationship between the chromatic aberration factors and the changing point.

10. An image pick-up device as claimed in claim 7, wherein the pattern image is formed on a chromatic aberration board.

11. An image pick-up device as claimed in claim 10, wherein the chromatic aberration board is fixed in an area near a document platen.

12. An image pick-up device as claimed in claim 7, wherein the chromatic aberration factors are set for each color component.

13. An image pick-up device as claimed in claim 7, wherein a width of the ladder pattern is equal to a width of a plurality of pixels in an auxiliary scanning direction and a length of the ladder pattern is equal to a length of an entire scanning span in a main scanning direction.

14. An image pick-up device as claimed in claim 7, wherein the character amount includes color saturation.

* * * * *